March 3, 1970  D. E. EVERBURG  3,498,199
CAMERAS SHUTTER AND FILM ACTUATED SHUTTER LATCHING MEANS
Filed Aug. 7, 1967  2 Sheets-Sheet 1

INVENTOR.
DONALD E. EVERBURG
BY
ATTORNEY

March 3, 1970   D. E. EVERBURG   3,498,199
CAMERAS SHUTTER AND FILM ACTUATED SHUTTER LATCHING MEANS
Filed Aug. 7, 1967   2 Sheets-Sheet 2
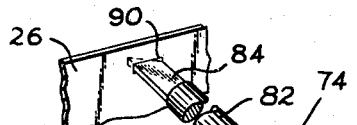
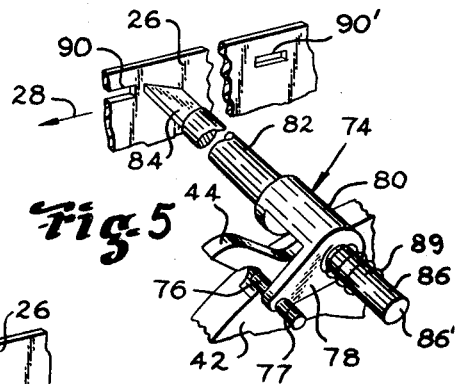
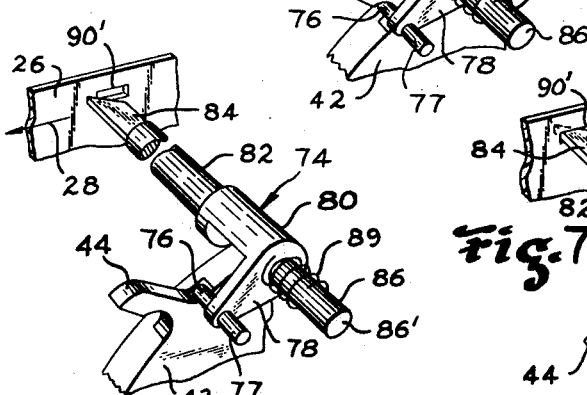
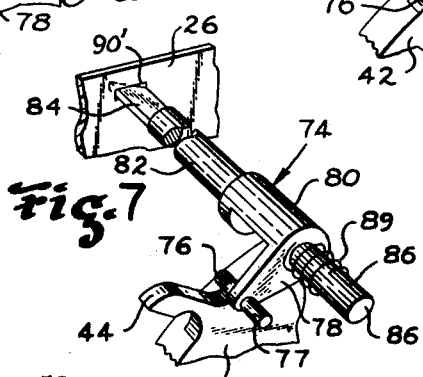
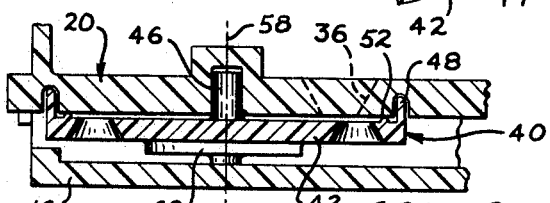
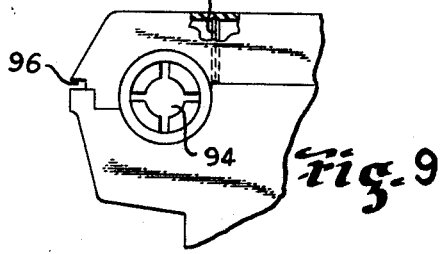
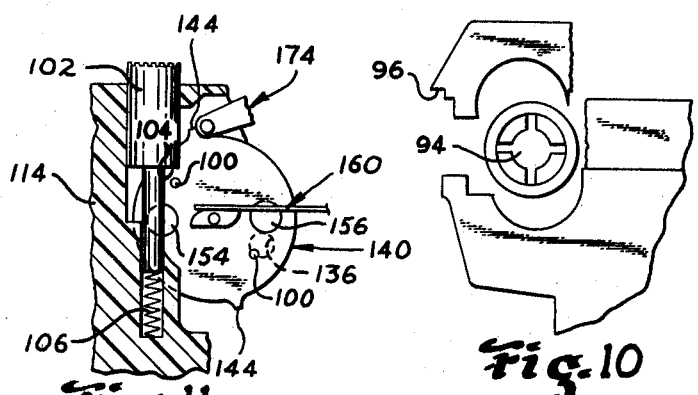
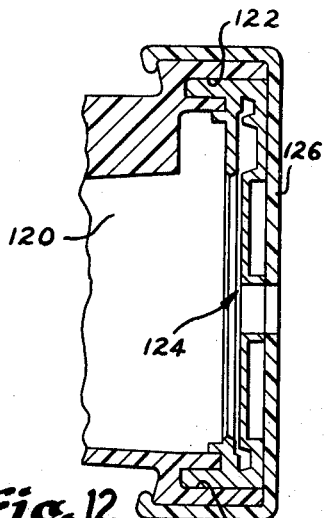
INVENTOR.
DONALD E. EVERBURG
BY
ATTORNEY United States Patent Office 3,498,199
Patented Mar. 3, 1970

3,498,199
CAMERA SHUTTER AND FILM ACTUATED SHUTTER LATCHING MEANS
Donald E. Everburg, Southbridge, Mass., assignor to American Optical Corporation, Southbridge, Mass., a corporation of Delaware
Filed Aug. 7, 1967, Ser. No. 658,932
Int. Cl. G03b 9/10
U.S. Cl. 95—58          3 Claims

ABSTRACT OF THE DISCLOSURE

A camera having a rotatable disc shutter with a shutter latch for preventing accidental double exposure of marginally perforated strip film in the camera. The shutter has one or more openings therethrough arranged to pass across an exposure aperture in the camera upon rotation of the shutter. The shutter is resiliently biased to normally assume a position of rest occluding the exposure aperture. Following each passage of a shutter opening over the exposure aperture, the shutter actuating rod engages the film perforation to prevent further rotation of the shutter and double exposure of the film. Movement of the film disengages the actuating rod from the film perforation and unlatches the shutter. The shutter automatically assumes its position of rest and readiness for further rotation in passing the same or another opening across the camera exposure aperture. Each rotation of the shutter disc is initiated manually and carried through to completion by the resilient biasing thereof.

BACKGROUND OF THE INVENTION

Field of the invention

This invention relates to cameras more particularly of the low cost fixed speed shutter type and components thereof.

Description of the prior art

In the field of low cost camera manufacturing, modern plastic molding techniques used to produce the cases, film magazines, operating buttons, knobs, levers, and even lenses, have made possible great strides forward in quality cost reduction. However, further substantial cost reduction has, heretofore, been difficult to achieve without sacrifice of high quality picture production and the conveniences of simple and fool-proof operation.

With the manufacturing cost of camera optics, casings and related components greatly minimized by modern plastic molding technology, further cost reduction in camera manufacture now requires particular consideration of the camera mechanics with a view toward greater simplification and minification of parts. In this regard, one of the most pertinent areas is the presently overcomplicated camera shutter and its associated operating mechanism with which this invention is especially concerned.

Accordingly, it is an object of the present invention to improve both structurally and economically over current low cost camera constructions in general and especially their shutters and shutter operating mechanisms. As a corollary of this, the invention features a complete camera of high quality construction which may be marketed, with a roll of film, at a cost warranting disposal of the camera following use and removal of its one film.

SUMMARY OF THE INVENTION

One aspect of the present invention which makes a major contribution to quality cost reduction in camera manufacture concerns the provision of a novel fixed speed shutter which is operatively positioned over the camera's exposure aperture. The shutter consists simply of a rotatable apertured plate intermittently accessible to an operator's finger and put into automatic action by an overriding cam and spring coupling when the action is initiated by slight rotation of the plate with the finger tip. Once rotation of the plate is started, the overriding coupling takes the action of continuing rotation of the plate out of the operator's control and causes the plate aperture to pass across the camera exposure aperture at a speed which is preset for proper picture taking exposure of the camera film.

The present inventive concept further extends to the provision of novel film activated shutter latching means for avoiding double exposure of the camera film. Following each picture taking exposure, the latching means acts to stop rotation of the shutter plate at a position where finger access thereto and further rotation is prevented. The shutter plate is, however, released by winding of the film whereupon it again assumes a position of accessibility to the finger for reactivation in the taking of a next picture. The latching means also serves to facilitate accurate metering of the film by indicating when each frame of the film is or is not in proper picture taking aligned relationship with the camera exposure aperture. As it will become apparent hereinafter, this indication may be sensed visually by observance of an outwardly exposed portion of the latching means, aurally by notice of the sound produced by action of the latching means or by tactile sensation of the action and/or the combination of any number or all of such perceptions.

Other features of the present invention relate to the provision of novel film adapting means, view finders and case designs.

Details of the present inventive concept will be more fully understood by reference to the following description and the accompanying drawing:

DESCRIPTION OF THE DRAWING

FIGS. 4, 5, 6 and 7 are enlarged fragmentary perspective views of pertinent parts of the aforesaid mechanism illustrating four sequential relative positions of these parts during operation of the mechanism in a manner to be described hereinafter;

FIG. 8 is a fragmentary cross-sectional view of the mechanism shown in FIG. 3 taken along a horizontal plane thereof in the general location of line 8—8 of FIG. 3 and looking in the direction of the arrows;

FIGS. 9 and 10 are fragmentary plan views of an end portion of the camera of FIG. 2;

FIG. 11 is a fragmentary cross-sectional view of a modification of the invention; and FIG. 12 is a cross-sectional view of a portion of the camera depicted in FIG. 1 taken generally along line 12—12 of FIG. 1.

DESCRIPTION OF THE PREFERRED EMBODIMENTS

Figure 1:
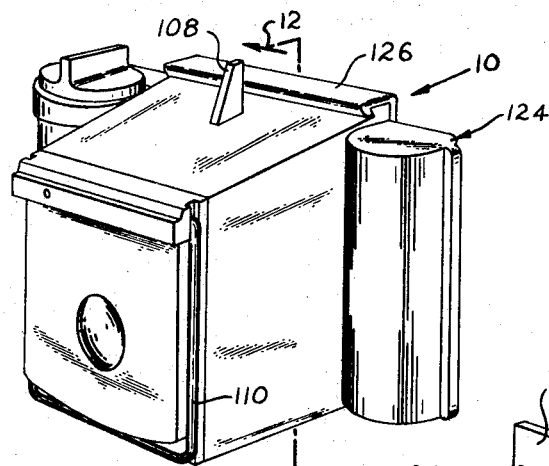
FIG. 1 illustrates in perspective one embodiment of the present invention.
Figure 2:
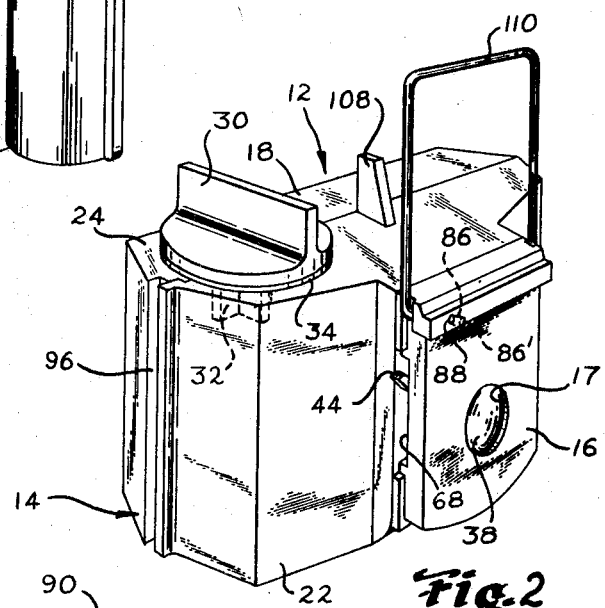
FIG. 2 is a perspective illustration of another embodiment of the invention.

Typical of two but not restrictive to all embodiments of camera design contemplated herein are cameras 10 and 12 of FIGS. 1 and 2 respectively.

Camera 10 exemplifies a type adapted to removably receive preloaded roll film magazines and camera 12 serves as an example of a type into which a roll of film is loaded directly. Otherwise, cameras 10 and 12 are substantially alike in that there is incorporated in each the same shutter and film actuated shutter latching means, details of which are illustrated in FIGS. 3–8.

The mechanism depicted in FIGS. 3–8 is taken from camera 12 of FIG. 2 which will be described in detail with the understanding that camera 10 is similarly equipped as already mentioned.

Figure 3:
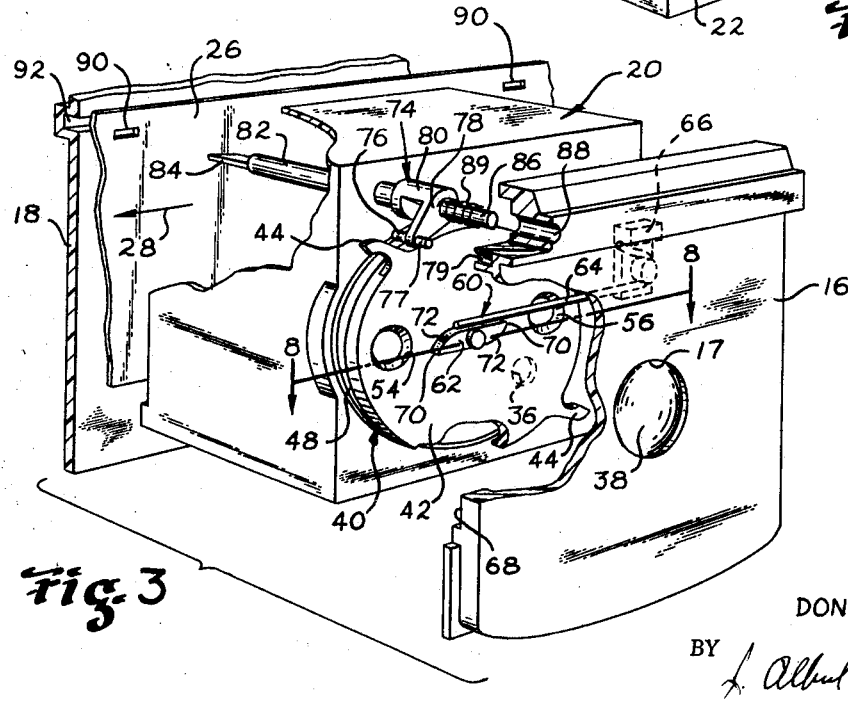
FIG. 3 is a fragmentary illustration of the mechanism of the camera illustrated in FIG. 2 with certain parts thereof shown in disconnected or exploded fashion for clarity of illustration and with other parts not essential to an understanding of the invention omitted.

Casing 14 of camera 12 which may be outwardly styled according to the manufacturer's desire and molded of styrene plastic or an equivalent material is comprised basically of front plate 16, back 18 and intermediate hollow box-like film exposure chamber 20 all illustrated in simplified disconnected or exploded fashion in FIG. 3.

For ease of installing the camera shutter and its associated components to be described in detail shortly, it is preferable but not essential that front plate 16 be formed separately from main body 22 (FIG. 2) of casing 14 and cemented, heat sealed or otherwise attached thereto following installation of the aforesaid components. Chamber 20, however would ordinarily be formed as an integral molded section of main body 22 and back 18 would ordinarily include the top, sides and bottom of a generally hollow molded rear cover 24 (FIG. 2) either detachably or permanently affixed to main body 22 of camera casing 14. The latter arrangement of body 22 and rear cover would be used when camera 12 is factory loaded with film and intended for disposal following use of the one film.

Any two or more of the aforesaid parts of casing 14 may be molded or otherwise formed as an integral unit with provision being made between rear cover 24 and body 22 for receiving a roll of film 26 (FIG. 3) which is adapted to be intermittently advanced laterally across exposure chamber 20 against back 18 in the direction of arrow 28 (FIG. 3). Key 30 (FIG. 2) which is inserted into a film winding spool within casing 14 is used to effect such advancement of film 26.

Details of the film spools and their supporting means within casing 14 are, for purposes of simplifying this disclosure, not shown herein. These details are not of particular importance to the crux of the present invention since it is contemplated that camera 12 may incorporate almost any film adapting and winding means now being used in low cost cameras currently on the market. Those interested in details of spool supporting and film winding mechanisms may refer to Patent Nos. 2,150,106 and 2,208,797, for example, or examine market structures.

A simple winding device contemplated for use with camera 12, however, comprises the illustrated key 30 having tang 32 shown in dotted lines, FIG. 2, which is pressed into a film winding spool through an opening in the top of casing 14. A pad 34 of soft plastic or rubber located between the head of key 30 and upper surface of casing 14 provides a light seal around the opening and, at the same time, it produces a slight frictional drag on key 30 requiring that positive action be taken to wind the film. Thus, unintended winding or unwinding (loosening) of the film on its spool or spools is avoided. It is to be understood that in factory installation of the film or even consumer installation, the unexposed film roll may be deposited without a spool in a suitable pocket provided at the side of the camera opposite to key 30, pulled across back 18 and threaded into the winding spool. One end of a film winding spool 94 can be seen in FIGS. 10 and 11.

The front of chamber 20 has camera exposure aperture 36 (FIGS. 3 and 8) which, in the usual fashion, is axially aligned with camera lens 38 in the completed camera assembly. As already mentioned, lens 38 may be formed of ground and polished glass or molded of optical quality acrylic plastic or its equivalent and cemented or arranged to be snapped into opening 17 in plate 16. It is also contemplated that plate 16 and lens 38 may be formed in a single molding operation with opaque and clear plastic materials respectively which are compatible for fusion to one another in the molding thereof or both molded of the same transparent plastic material with the plate subsequently rendered opaque around the lens by spray painting or otherwise coating one or both sides thereof.

It is intended to be made clear that all previous and future reference to camera components of this invention as being formed of molded plastic materials is intended not to be restrictive to the choice materials used or manner in which the components are molded and/or otherwise formed. Molded and/or machined metals may also be used.

It would be natural for the artisan to select suitable molding materials and apply the most applicable procedures in forming the camera components whether they need to be partially machined after molding or entirely machined from plastic or metal stock, if not completed entirely by molding. Thus, in the interest of brevity this disclosure will not deal particularly with materials, methods or procedures used to manufacture the disclosed camera components.

A featured component of the present camera construction is shutter 40 (FIGS. 3 and 8) of one-piece molded construction.

Shutter 40 comprises circular plate 42 having diametrically opposed hooked extensions 44 which will be referred to hereinafter as operating levers 44. Extending rearwardly of plate 42 is axle 46 (FIG. 8) which is journaled in the front wall of chamber 20 eccentrically of exposure aperture 36 (FIG. 8). A peripheral lip 48 on plate 42 rides loosely in circular groove 50 in the front wall of chamber 20 to form a light trap preventing light from entering exposure aperture 36 through the clearance between plate 42 and the front wall of chamber 20. Annual bead 52 disposed against chamber 20 also acts as a light seal while its main function is that of a bearing which, by making substantially only line contact with chamber 20, provides nearly frictionless bearing contact with the chamber wall. Bead 52 thus prevents wobble of plate 42 during rotation therof and keeps axle 46 running true in its journaling. Plate 42 is held in place by front plate 16, see FIG. 8.

Plate 42 which normally keeps exposure aperture 36 capped to prevent unwanted exposure of film 26 has a pair of diametrically opposed shutter openings 54 and 56. Openings 54 and 56 are spaced from axis 58 (FIG. 8) of plate 42 a distance equal to the radial distance from axis 58 to exposure aperture 36 so that during each half (180°) revolution of plate 42, one of said openings will pass across exposure aperture 36 and uncap the aperture for effecting a picture taking exposure of the film. All surfaces of shutter plate 42 and chamber 20 are rendered non-reflective to light either with dull black paint and/or flocking or by use of a dull black plastic material in the molding thereof so that light happening to enter openings 54 and 56 when the camera is not in use will be prevented from reaching exposure aperture 36.

Shutter drive means 60 (FIG. 3) functions to render the aforesaid action of uncapping exposure aperture 36 automatic at a preset speed regulated for proper timing of picture taking exposure.

The illustrated embodiment of drive means 60 comprises cam 62 (FIGS. 3 and 8) and wire spring 64 which bears thereagainst. Cam 62 is preferably formed as an integral molded part of plate 42 but, of course, may be formed separately and cemented, pinned or otherwise affixed to the plate. Spring 64 has its distal end fixed to front plate 16 and its proximal end portion resting under tension against cam 62. Means such as block 66 on the inner side of plate 16 may be employed to make the connection to plate 16 as illustrated in FIG. 3.

In the assembled camera (FIG. 2), operating levers 44 become sequentially exposed through slot 68 in plate 16 when shutter plate 42 is rotated so that operation of shutter 40 may be initiated by pressing downwardly with a finger tip or the thumb upon the particular lever 44 appearing in slot 68 as shown in FIG. 2.

As lever 44 is depressed, causing cam 62 to rotate, spring 64 is forced to ride upwardly along one of the steep slopes on cam 62. Shortly before the operator's finger makes contact with the camera body (i.e. before lever 44 passed inwardly of the camera body adjacent the lowermost end of slot 68) spring 64 rides over the peaked end 70 of cam 62 and begins to ride down the adjoining slope or curved side 72. Thereafter, spring 64 takes the control of continued rotation of shutter plate 42 out of the operator's hands and effects automatic continued rotation thereof at a fixed speed until one opening (e.g. opening 54) has passed over and beyond exposure aperture 36. The pressure of spring 64 against the curved side 72 of cam 62 causes the cam and attached shutter disc to rotate far enough to complete substantially 180° rotation. The rotation is actually slightly less than 180° which will be explained later.

The speed at which the shutter opening is caused to pass over exposure aperture 36 is determined by the shape of the curved side 72 of cam 62, the length of spring 64 and its diameter and/or extent of tensional preloading against cam 62 and the arcuate distance across openings 54 and 56. The speed of shutter 40 may be adjusted to suit the requirements of particular films intended to be used in the camera by altering any one or more of the aforementioned shutter speed controlling factors.

As illustrated, cam 62 has two identical opposite ends and sides so that the aforementioned action of shutter drive means 60 takes place during each one half revolution (180°) of plate 42. It is to be understood, however, that cam 62 may have more than two identical sides. For example, with three peaks 70 and a corresponding number of curved sides 72 and three equiangularly spaced shutter openings and levers 44, a picture taking exposure could be taken with each 120 degrees of rotation of plate 42. Similarly, four peaks on the cam with four shutter openings and a corresponding number of levers 44 would provide for effecting a picture taking exposure with each 90 degrees of shutter rotation.

For achieving exceptionally smooth action in the operation of overriding coupling 60 without need for lubrication which would effect the shutter speed under changing temperatures, the unitary structure of plate 42, axle 46 and cam 62 may be formed of nylon which is noted for its excellence in producing smooth acting bearing surfaces. This, however, is not to be taken as being prejudicial to the use of other plastic materials or even metals.

Another featured component of the preesnt camera construction is shutter latch 74 (FIGS. 3–7) for avoiding double exposure of film 26. Latch 74 comprises catch 76 supported by arm 78 depending from head 80. Extending rearwardly from head 80 is actuating rod 82 which is terminated with a horizontally disposed flat film metering foot 84. Disposed in coaxial relationship with rod 82 and head 80 is forwardly extending pin 86.

When main body 22 and front plate 16 of the camera are assembled as shown in FIG. 2, pin 86 extends through opening 88 (FIGS. 2 and 3) in the front plate.

Rod 82 of latch 74 extends through the front of exposure chamber 20 (FIG. 3) with there being enough clearance between plate 16 and chamber 22 to receive head 80 and allow for axial reciprocation of latch 74 to the extent that catch 76 may be moved into and out of intercepting relationship with operating levers 44 of shutter 40. End 77 of catch 76 engages in opening 79 of plate 16 to prevent rotational displacement of latch 74 in the assembled camera. Latch 74 is continually resiliently biased by spring 89 toward chamber 20 to the extent that catch 76 will intercept a lever 44 approaching it when shutter plate 42 is rotated. Spring 89 is shown by single line illustration to better depict its intended lightness of structure (i.e. wire size) which, as it will become apparent, is necessary to prevent tearing or other damage to film 26 by foot 84.

Film metering foot 84 is distally horizontally tapered inwardly away from film 28 in a direction opposite to the direction of winding movement of film 26 which has been indicated by arrow 28 (FIGS. 3, 5 and 6).

Film 26, having the usual and well-recognized rectangular metering perforations 90 between predetermined metering intervals, i.e. successive picture producing frames thereof, rides flatly across back 18 of the camera when it is wound with key 30. Depression 92 in camera back 18 permits foot 84 to drop into perforations 90 when registration thereof with foot 84 is made. Foot 84 is vertically aligned with the horizontal line of perforations 90 at all times and lightly urged against film 26 by spring 89 in the assembled camera.

To facilitate explanation of the film actuated shutter latch 74 further description theerof will be made from the standpoint of its operation and, to this end, attention is now called to FIGS. 4, 5, 6 and 7 which illustrate pertinent parts shown in FIG. 3 in four sequential relationships which result in response to operation of the mechanism.

Referring first to FIG. 4 it is assumed that a picture has been taken by the camera operator but he has not yet advanced film 26 for the next picture taking exposure.

At this point it can be seen that foot 84 of latch 74 is engaged in a film perforation 90. Shutter plate 42 has made nearly, but not quite, 180 degrees of rotation, it having been stopped by catch 76 just before lever 44 reaches slot 68 shown in FIGS. 2 and 3. Thus, the operator has no access to lever 44 and cannot reactuate shutter plate 42 until film 26 is advanced. Even if the design of casing 14 permitted access to lever 44, catch 76 prevents rotation of plate 42. Thus, the consequence of accidental double exposure of film 26 is avoided.

In preparing to take the next picture by winding film 26 in the direction of arrow 28 (FIGS. 3 and 8) with knob 30 (FIG. 2) the aforementioned tapered end or cam surface of foot 84 causes the foot to gradually ride out of perforation 90 and along the front side of film 26 as shown in FIG. 5. This action forces latch 74 forward (toward front plate 16) moving catch 76 away from lever 44 thereby releasing shutter plate 42. Under the influence of spring 64 shutter plate 42 immediately completes its 180 degrees of revolution stopping at the position shown in FIGS. 2, 3 and 6 with lever 44 now accessible to the operator's finger.

Attention is called at this point to the fact that in FIGS. 5 and 6, film 26 has not yet reached the position where its next metering perforation 90′ (FIG. 6) is registered with foot 84 and, accordingly it is not ready for its next picture taking exposure. However, warning of this is given by the fact that while shutter latch 74 is moved toward plate 16 by riding on the front face of film 26, as already mentioned, end 86′ of pin 86 protrudes outwardly of camera casing 14 beyond the front face of plate 16 as shown by dotted outline in FIG. 2. This end 86′ of pin 86 is preferably painted or otherwise colored red or another preferably vivid color which is in sharp contrast to the color of front plate 16 and will be immediately recognized as indicating the aforesaid warning that lever 44 is not to be actuated at this time.

When the winding of film 26 brings aperture 90′ into registry with foot 84, the foot will snap thereinto (FIG. 7) under the influence of spring 89 with a perceptible sound and usually, if not always, offering through responsive vibration of the case a simultaneous tactile sensation to the operator indicating to him that the camera film is in correct position for taking the next picture.

It should be noted that under the condition illustrated in FIG. 7 catch 76 is behind lever 44 permitting shutter plate 42 to be rotated another step of nearly 180 degrees when such rotation is started with the operator's finger tip or thumb as already described. Also, with foot 84 now in perforation 90', end 86' of pin 86 is retracted into front plate 16 giving the operator visual indication that the danger of double exposure no longer exists and that the camera is in readiness for the next picture taking exposure. This retraction of pin 86 can also be sensed by feeling opening 88 in the camera's front plate 16.

It should be noted that with catch 76 behind lever 44 as shown in FIG. 7, the catch is in a position of readiness to again stop rotation of shutter plate 42 shortly before completion of its next exposure taking 180 degree revolution by latching beneath the hooked underside of the particular lever 44 which is diametrically opposite to the lever 44 shown in FIG. 7. In other words, the condition depicted in FIG. 4 will be repeated after the next picture taking operation and followed again by the conditions described with relation to FIGS. 5, 6 and 7, and so on, until film 26 is used up. Then, as in the case of most all roll film cameras, the used film is wound completely onto its winding spool 94 (FIG. 9) in preparation for removal from the camera and development.

The extreme simplicity and low cost of camera manufacture contributed by the present inventive concept makes it economically possible to completely dispose of camera 12 after its film is removed. Thus, it would be natural in such a case to desire a simple way of breaking away the back of the camera for quick and easy access to its used film since no future use of the camera would be made.

Accordingly, there is illustrated in FIG. 2 a key slot 96 extending across the end of camera casing 14 (FIGS. 2, 9 and 10) and a shallow continuous break-away groove 98 (FIG. 9) internally of rear cover 24 across its top, back and bottom.

By inserting a coin, screw driver blade or other similar device into key slot 96 and twisting the device, a break-away of casing 14 can be quickly, and easily effected as shown in FIG. 10 giving immediate access to the used film.

FIG. 11 illustrates a modification of the invention wherein the camera shutter may be operated with a push button rather than the aforementioned levers 44.

In FIG. 11 shutter 140 and shutter latch 174 are identical to shutter 40 and latch 74, already described, with the exception that actuating pins 100 have been substituted for the elongated end portions of levers 44 which, in this instance, are unnecessary. Trunks of levers 44, illustrated by reference numerals 144 in FIG. 11, are, however, used and will be hereinafter referred to as stops 144 for avoiding double exposure of the camera film when they are caught by shutter latch 174 after each picture taking exposure. These stops 144 and latch 174 operate as do the corresponding elements, i.e. levers 44 and latch 74, of camera 12.

Push button 102 in camera casing 114 has shoulder 104 which engages pins 100 when button 102 is depressed thereby initiating rotation of shutter 140. This rotation, as before described, is taken over by overriding spring loaded coupling 160 causing a shutter opening 154 or 156 to uncap and pass beyond the camera exposure aperture 136 at a predetermined speed. When at rest, push button 102 is held out of contact with pins 100 by spring 106.

Also featured in the present inventive concept is a simple and inexpensive view finder illustrated on both of cameras 10 and 12. The view finder comprises in each case, a sight 108 and scene framing wire 110. The sight is used to center the scene desired to be photographed within the framing thereof produced by wire 110. Wire 110 is hinged to the camera casing so that it may be pivoted downwardly over the front of the camera (e.g. as shown on camera 10, FIG. 1). When this is done, wire 110 covers operating lever 44 and prevents accidental actuation of the shutter.

Being substantially identical to camera 12 with the exception of its case design, camera 10 needs no description of its picture taking mechanism. Being adapted to receive conventional factory preloaded film magazines, however, its exposure chamber 120 (FIG. 12) is open at the back with a pocket 122 formed therein which receives the intermediate section of film magazine 124 (FIGS. 1 and 12). Clip 126 of resilient plastic or thin sheet metal is snapped onto the camera casing over magazine 124 to hold it in place. If it is desired to market camera 10 as a disposable item, magazine 124 may be cemented into pocket 122 and clip 126 eliminated.

Details of film magazines will not be given herein since these are well known to the artisan and it is contemplated herein to employ the use of magazines of the type now in everyday use. However, those interested in such detail may refer to Patent No. 3,138,084 or examine a market structure.

It should be apparent that other modifications of this invention are possible, based on teachings provided herein and, accordingly, all which fall within the following claims or within the scope of equivalency thereof are intended to be covered.

What is claimed is:

1. In a camera having a casing forming an internally disposed film exposure chamber with an exposure aperture extending through a wall of said casing into said chamber and means for supporting an intermittently marginally perforated strip of film in said chamber oppositely of and spaced from said aperture for movement therein across the axis of said aperture, the improvement comprising the combination of:

a shutter disc rotatably mounted on said casing wall in overlapping relationship with said exposure aperture, said disc being rotatable in one direction about its axis and having an opening extending therethrough, said opening being so positioned as to pass across said exposure aperture when said disc is rotated;

means for rotationally biasing said disc to a position of rest occluding said exposure aperture and stop means on said disc for preventing accidental rotation of said disc beyond said position of rest following each passage of said opening across said exposure aperture;

reciprocating film metering and shutter latching means in said casing, said means comprising a rod extending from adjacent an edge of said disc to said perforated marginal portion of said film;

means resiliently biasing said rod toward said film, the end of said rod adjacent said film being adapted to enter into a film perforation when mated therewith and to ride out of said perforation against a side of the film when said film is moved;

a catch on said rod adjacent said edge of said shutter disc constructed and arranged to latch with said disc stop means immediately prior to said disc reaching said position of rest when said rod is engaged within a film perforation whereby said accidental rotation of said disc is prevented, an autmotic release of said disc for continued biasing thereof to said position of rest is effected by movement of said film sufficiently to cause said rod to ride out of a perforation in which said corresponding end thereof is engaged and into a succeeding film perforation thus permitting further rotation of said disc from said position of rest for repeated passage of said opening across said exposure aperture and repeated latching with said disc stop means.

2. The combination as recited in claim 1 wherein said shutter disc has a plurality of said openings and an equal plurality of said stop means.

3. The combination as recited in claim 1 wherein a portion of said rod adjacent said catch extends through said casing wall to one extent when said rod is engaged in a perforation in said film and to a greater extent when said rod is caused to ride out the perforation.

References Cited

UNITED STATES PATENTS

| | | | |
|---|---|---|---|
| 1,213,687 | 1/1917 | Pelham | 95—31 |
| 1,701,492 | 2/1929 | Chapuis. | |
| 3,392,649 | 7/1968 | Rühle | 95—31 |

FOREIGN PATENTS 724,756  10/1931  France.

JOHN M. HORAN, Primary Examiner
L. H. McCORMICK, Jr., Assistant Examiner

U.S. Cl. X.R.

95—31